(12) United States Patent
Wang

(10) Patent No.: US 8,094,449 B2
(45) Date of Patent: Jan. 10, 2012

(54) FASTENING STRUCTURE OF COMPUTER PERIPHERAL DEVICE

(75) Inventor: Wei Chung Wang, Taipei County (TW)

(73) Assignee: Kye Systems Corp., San Chung, Taipei (TW)

( * ) Notice: Subject to any disclaimer, the term of this patent is extended or adjusted under 35 U.S.C. 154(b) by 192 days.

(21) Appl. No.: 12/656,863

(22) Filed: Feb. 18, 2010

(65) Prior Publication Data

US 2011/0141689 A1    Jun. 16, 2011

(30) Foreign Application Priority Data

Dec. 11, 2009   (TW) ............................... 98142602 A

(51) Int. Cl.
*G06F 1/16*    (2006.01)

(52) U.S. Cl. ................ 361/679.58; 206/451; 312/334.5; 248/316.7

(58) Field of Classification Search .................. 206/451, 206/320, 702, 39, 454; 455/550.1, 575.3; 361/679.36, 679.33, 679.4, 679.57, 679.01, 361/679.6, 679.46, 679.26, 679.43, 679.31; 439/131, 207, 637, 110, 55; 312/223.2, 223.6, 312/333, 334.5, 257.1; 248/74.2, 371, 118, 248/316.7, 346.03

See application file for complete search history.

(56) References Cited

U.S. PATENT DOCUMENTS

| | | | |
|---|---|---|---|
| 7,911,777 B2 * | 3/2011 | Fan et al. ................. | 361/679.36 |
| 2004/0014487 A1 * | 1/2004 | Leppanen et al. ......... | 455/550.1 |
| 2008/0017538 A1 * | 1/2008 | Morchio ....................... | 206/451 |

* cited by examiner

*Primary Examiner* — Hung Duong

(74) *Attorney, Agent, or Firm* — Bacon & Thomas, PLLC

(57) ABSTRACT

A fastening structure of a computer peripheral device includes a combining slot and a fastening body disposed on a housing member of the computer peripheral device. The fastening body has a first restricting surface and a second restricting surface. The computer peripheral device is clamped to a first object through the first restricting surface of the fastening body and the combining slot, or a second object is hooked to the computer peripheral device through the second restricting surface of the fastening body.

10 Claims, 5 Drawing Sheets

FASTENING STRUCTURE OF COMPUTER PERIPHERAL DEVICE

CROSS-REFERENCE TO RELATED APPLICATIONS

This non-provisional application claims priority under 35 U.S.C. §119(a) on Patent Application No(s). 098142602 filed in Taiwan, R.O.C. on Dec. 11, 2009, the entire contents of which are hereby incorporated by reference.

BACKGROUND OF THE INVENTION

1. Field of Invention

The present invention relates to a fastening structure, and more particularly to a fastening structure capable of providing two combining modes.

2. Related Art

Thanks to the powerful functions and portability, notebooks have become the most commonly used portable electronic tools for business people and students. A notebook generally has a built-in touchpad for a user to operate the cursor with fingers. However, since it is much easier to control the cursor with a mouse than with fingers, most notebook users additionally buy a cordless mouse for controlling the cursor.

The cordless mouse requires a wireless signal transmitter for exchanging signals with the notebook. When the notebook is used, the wireless signal transmitter is inserted into a connection port of the notebook; and when the notebook is packed, the wireless signal transmitter is pulled out of the connection port of the notebook. In order to receive the wireless signal transmitter, currently, the cordless mouse is mostly designed with a receiving slot or a snapping slot. Thus, when the wireless signal transmitter is not used, the wireless signal transmitter is received in the receiving slot or snapped with the snapping slot, so as to prevent the wireless signal transmitter from being lost.

In addition, when the notebook user needs to change the working position within a short distance (for example, moving to another meeting room or classroom), the user does not pack the notebook into a carrying bag in most cases, but instead, directly takes the notebook and the cordless mouse and changes the position. In order to make it convenient for the user to hold the notebook and carry the cordless mouse at the same time, for example, V550 NANO Cordless Mouse for Notebooks from the Logitech International S.A. is designed with a clip-and-go dock. The clip-and-go dock is adhered to the notebook. The cordless mouse is designed with a combining slot, and the cordless mouse is hooked to the clip-and-go dock through the combining slot, such that the cordless mouse is attached to the notebook, and the user does not need to worry about the cordless mouse falling off during movement.

However, in order to receive the wireless signal transmitter, the cordless mouse needs to be designed with a receiving slot or a snapping slot. And, in order to combine the cordless mouse with the clip-and-go dock, the cordless mouse further needs to be designed with a combining slot. That is to say, in order to enable the cordless mouse to receive the wireless signal transmitter, and enable the cordless mouse to be hooked to the clip-and-go dock, the cordless mouse needs to be designed with two combining modes. As a result, the structure of the cordless mouse or the layout of the internal circuits thereof becomes more complex.

SUMMARY OF THE INVENTION

In view of the above problems, the present invention provides a fastening structure of a computer peripheral device, which is applicable to solve the problems in the prior art that two combining structures in different forms are required to be disposed on the housing of the computer peripheral device. Thus, the computer peripheral device has an excessively large overall volume, an excessively complex structure, and a difficult layout of the internal circuits of the computer peripheral device.

The present invention provides a fastening structure of a computer peripheral device, which is applicable to attach the computer peripheral device to a first object or receive a second object in the computer peripheral device. The fastening structure comprises a combining slot and a fastening body. The fastening body is disposed in the combining slot, and has a first restricting surface and a second restricting surface. The first restricting surface of the fastening body matches the first object, and the second restricting surface of the fastening body matches the second object. Therefore, the user may select to combine the first restricting surface of the fastening body with the first object, or combine the second restricting surface of the fastening body with the second object, thereby providing two different combining modes.

The efficacy of the present invention is that, the fastening structure provides two different combining and fixing modes for the computer peripheral device through the fastening body and the combining slot; for example, enables the computer peripheral device to be combined with a first object, or enables a second object to be combined with the computer peripheral device, so as to simplify the structural design of the computer peripheral device and the layout of the internal circuits thereof.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The computer peripheral device disclosed in the present invention is corresponding to an electronic device, and corresponding to a first object and a second object. The first object comprises, but not limited to, a buckle piece disposed on a notebook or the like. The second object comprises, but not limited to, a wireless transceiver, a counterweight member of the computer peripheral device, or an electrical connector of the computer peripheral device. In addition, the computer peripheral device comprises, but not limited to, a mouse, a trackball, a game console, a remote control, or a similar device for inputting peripheral signals. The electronic device comprises, but not limited to, a notebook, a tablet personal computer (Tablet PC), or an ultra mobile PC (UMPC). Moreover, the fastening structure of the present invention is an integrated fastening structure capable of being clamped to the first object or hooking with the second object. However, the present invention is not limited to examples described in the following embodiments.

Figure 1:
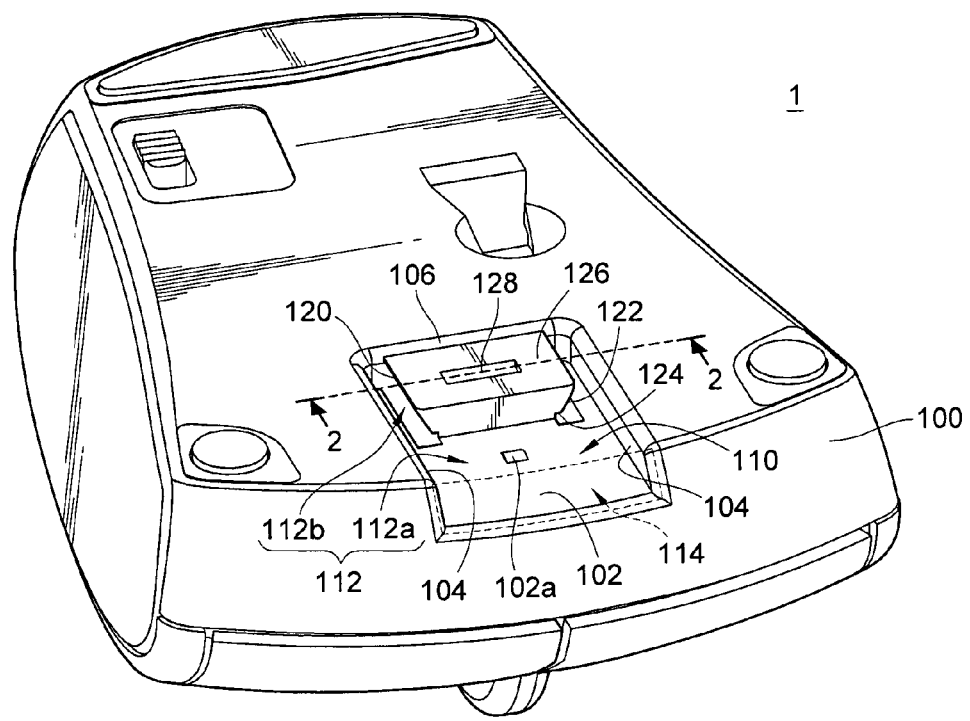
FIG. 1 is a schematic three-dimensional view of a computer peripheral device according to the present invention.
Figure 2:
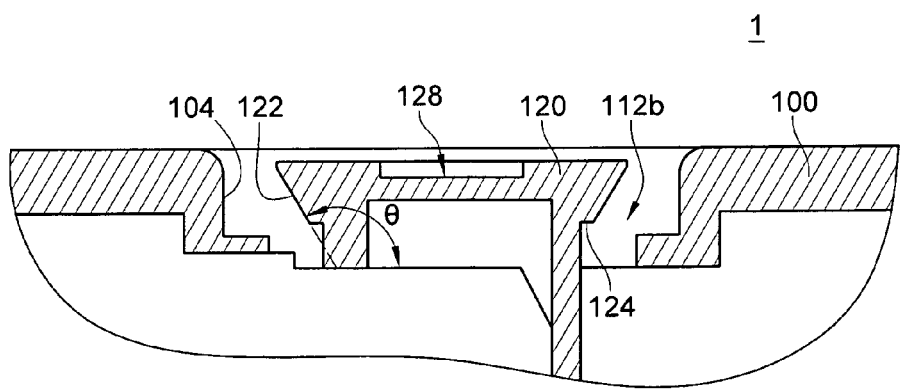
FIG. 2 is a schematic cross-sectional view of FIG. 1 taken along a direction 2-2.

FIG. 1 is a schematic three-dimensional view of a computer peripheral device according to the present invention, and FIG. 2 is a schematic cross-sectional view of FIG. 1 taken along a direction 2-2. Referring to FIGS. 1 and 2, a computer peripheral device 1 is a mouse, which comprises a housing member 100 for the user to hold and operate with the hand. A plurality of buttons and a scroll wheel are disposed on a top surface of the housing member 100, and the housing member 100 has a functional circuit (not shown in figures) disposed therein for executing preset functions of the computer peripheral device 1.

A combining slot 110 is recessed in an end edge of the housing member 100, and a fastening body 120 extends outwards from the combining slot 110. The combining slot 110 is formed by a bottom surface 102, two side walls 104, and a rear wall 106, and an accommodation space 112 and an insert opening 114 are formed in the combining slot 110. The fastening body 120 is disposed in the combining slot 110 and divides the accommodation space 112 into a receiving area 112a and a clipping area 112b, and the fastening body 120 is located in the clipping area 112b. The fastening body 120 at least has a first restricting surface 122 or a second restricting surface 124. Definitely, it should be understood that, the fastening body 120 may have the first restricting surface 122 and the second restricting surface 124 at the same time.

Figure 3:
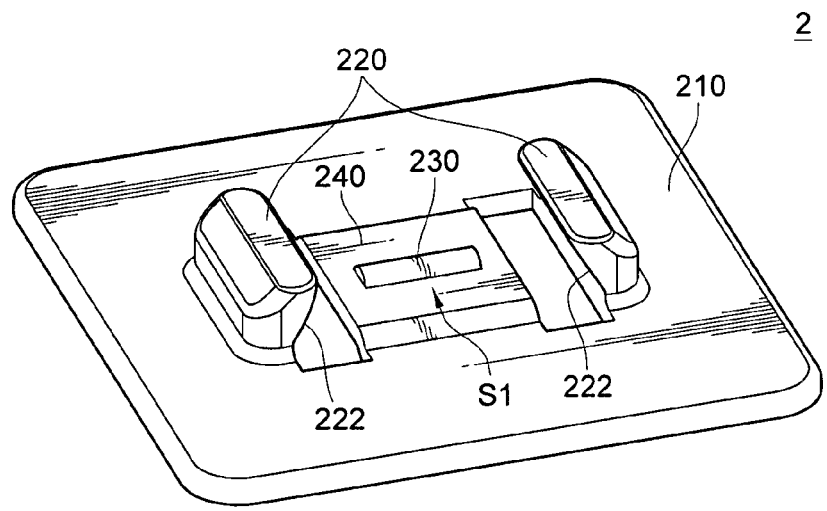
FIG. 3 is a schematic three-dimensional view of a first object according to the present invention.

FIG. 3 is a schematic three-dimensional view of a first object according to the present invention. Referring to FIG. 3, a first object 2 has a bottom plate 210 and two first combining members 220 that are spaced apart from each other and corresponding to each other, and each first combining member 220 has a corresponding surface 222. A first combining space S1 is formed between the two first combining members 220. A resilient plate 240 is bent and formed on the bottom plate 210, and the resilient plate 240 has a projecting portion 230, and is capable of providing a resilient force for the projecting portion 230.

Figure 4:
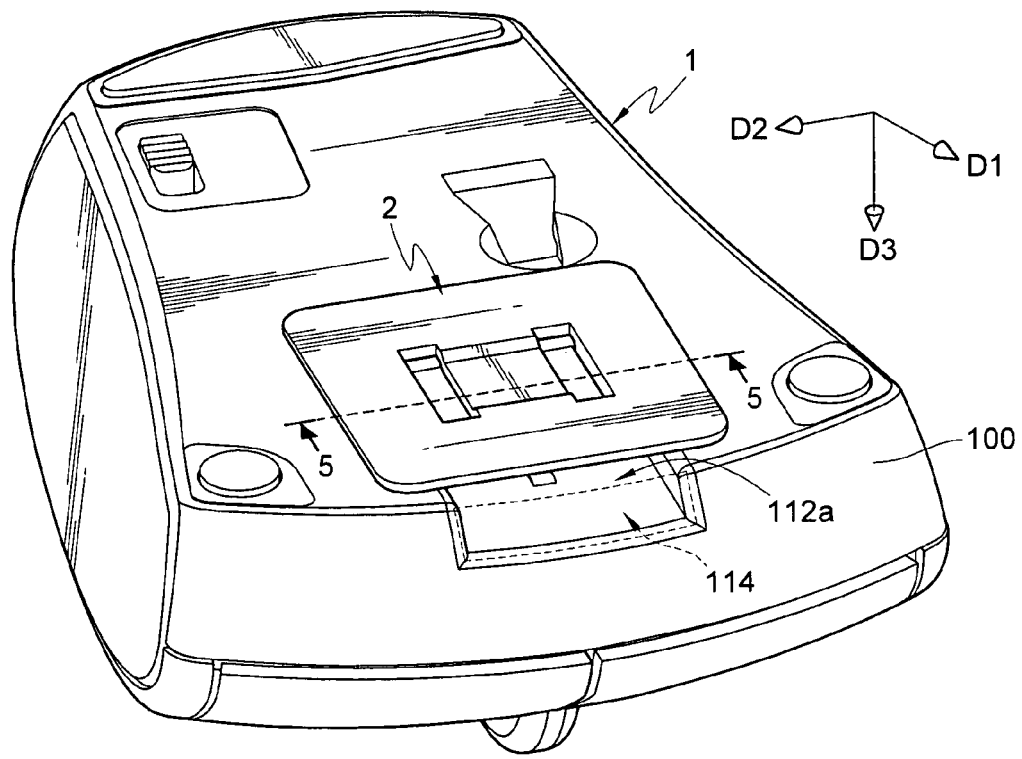
FIG. 4 is a schematic three-dimensional view of the computer peripheral device combined with the first object according to the present invention.
Figure 5:
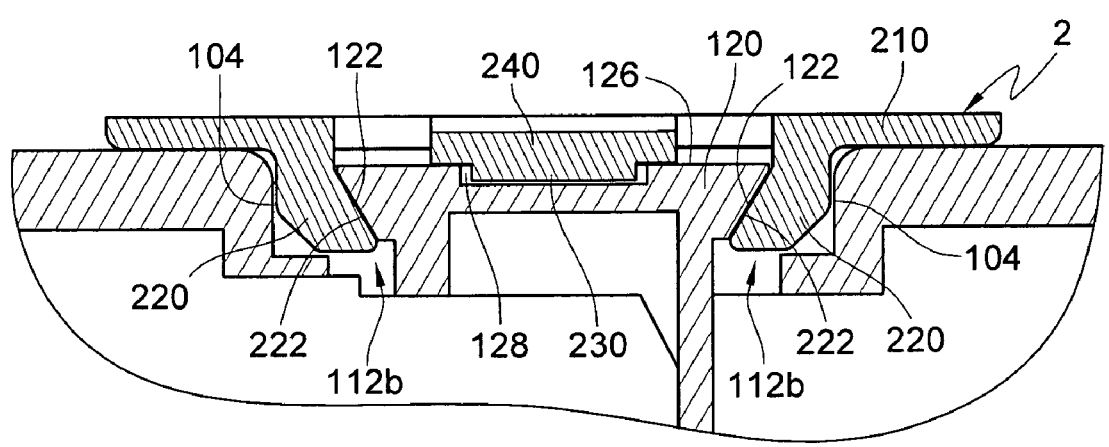
FIG. 5 is a schematic cross-sectional view of FIG. 4 taken along a direction 5-5.

When the user intends to carry the computer peripheral device 1 together with a notebook (not shown) along with him/her, the user may attach the computer peripheral device 1 to a first object 2 of the electronic device. FIG. 4 is a schematic three-dimensional view of the computer peripheral device combined with the first object according to the present invention, and FIG. 5 is a schematic cross-sectional view of FIG. 4 taken along a direction 5-5.

When the user combines the computer peripheral device 1 with the first object 2, the combining slot 110 moves relative to the first object 2 in a direction D1 towards the rear wall 106 and parallel to the bottom surface 102, and the first combining members 220 enter the combining slot 110 through the insert opening 114. An inclined angle θ is formed between the first restricting surface 122 and the bottom surface 102, and the second restricting surface 124 is parallel to the bottom surface 102 and spaced apart from the bottom surface 102 by a height. Therefore, when the first restricting surfaces 122 are clamped to the first combining members 220, the first restricting surfaces 122 face the corresponding surfaces 222. The corresponding surface 222 is a slanting surface forming an inclined angle θ with the first restricting surface 122, such that the two surfaces can match each other. Therefore, the first combining members 220 are restricted by the fastening body 120 and the side walls 104 at the same time due to the inclined angle θ.

At this time, the first combining members 220 are located in the clipping area 112b, and the first restricting surfaces 122 are attached to the corresponding surfaces 222 of the first combining members 220, so that the first combining members 220 are restricted by the fastening body 120 and the side walls 104. Therefore, the first object 2 may prevent the computer peripheral device 1 from moving along a direction D2 towards the side walls 104 and parallel to the bottom surface 102, or moving along a direction D3 away from and perpendicular to the bottom plate 210.

As shown in FIGS. 1 to 5, the fastening body 120 has a top surface 126 parallel to the bottom surface 102, and the top surface 126 has a clip slot 128. The clip slot 128 is corresponding to the position where the projecting portion 230 is disposed. Therefore, when the computer peripheral device 1 is sleeved and combined with the first object 2, the clip slot 128 enters the projecting portion 230, and restricts the movement of the computer peripheral device 1 relative to the first object 2 in the direction D1 towards the rear wall 106 and parallel to the bottom surface 102, so as to fix the computer peripheral device 1 to the first object 2. At this time, the computer peripheral device 1 may be stably clamped to the first object 2. Thus, even if the user moves while carrying along the notebook, the user does not need to worry about the computer peripheral device 1 falling off.

The resilient force provided by the resilient plate 240 of the bottom plate 210 ensures that the projecting portion 230 is well embedded in the clip slot 128, such that the computer peripheral device 1 is stably clamped to the first object 2, and does not fall off under an external impact. However, persons skilled in the art may additionally dispose the resilient plate 240 on the bottom plate 210 by adopting additional means, instead of adopting the configuration of the bottom plate 210 and the resilient plate 240 as an integral structure as disclosed in this embodiment.

Figure 6:
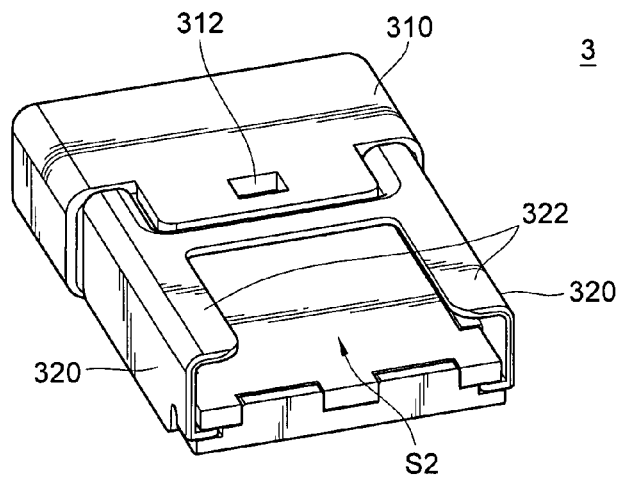
FIG. 6 is a schematic three-dimensional view of a second object according to the present invention.

FIG. 6 is a schematic three-dimensional view of a second object according to the present invention. Referring to FIGS. 1, 2, and 6, a second object 3 has a housing 310 and two second combining members 320 disposed on the housing 310. Each second combining member 320 forms a second combining space S2, and has a fin 322. The housing 310 has a transceiver circuit (not shown in figures) therein for transmitting and receiving wireless signals. When the second object 3 is not used, the user may receive the second object 3 in the computer peripheral device 1. The second object 3 disclosed in this embodiment is a wireless transceiver, but the present invention is not limited thereto.

Figure 7:
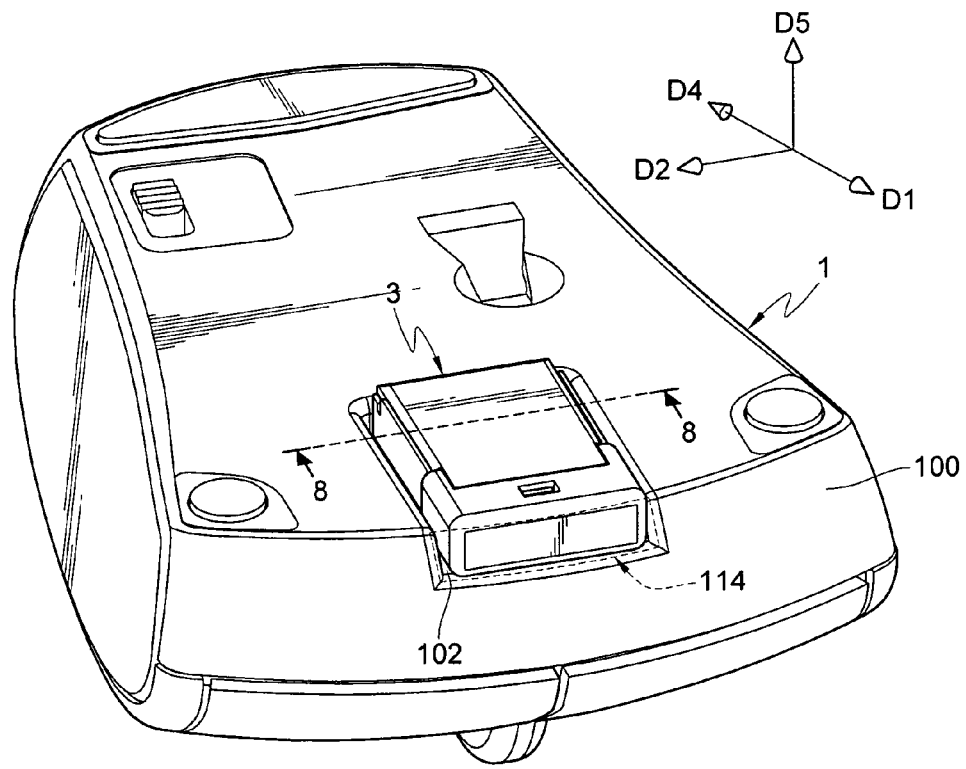
FIG. 7 is a schematic three-dimensional assembled view of the computer peripheral device combined with the second object according to the present invention.
Figure 8:
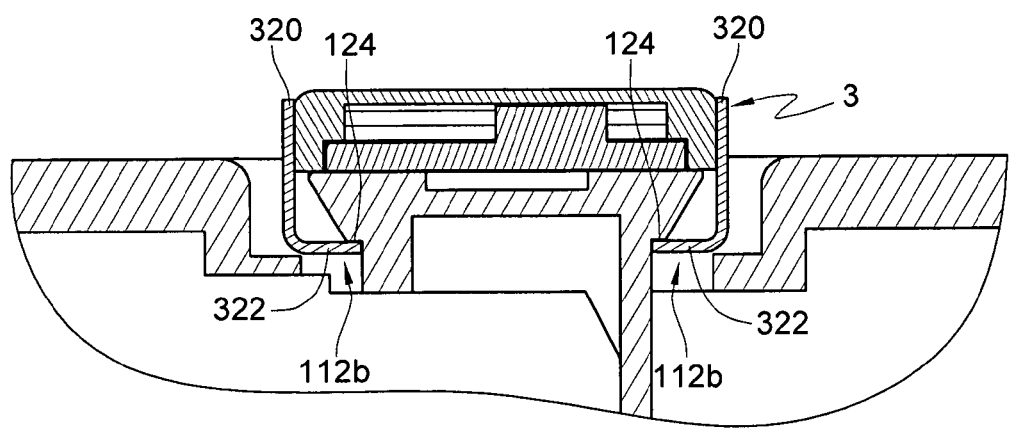
FIG. 8 is a schematic cross-sectional view of FIG. 7 taken along a direction 8-8.

FIG. 7 is a schematic three-dimensional view of the computer peripheral device combined with the second object according to the present invention, and FIG. 8 is a schematic cross-sectional view of FIG. 7 taken along a direction 8-8. Referring to FIGS. 7 and 8, in detail, when the user receives the second object 3 in the computer peripheral device 1, the second object 3 moves at the combining slot 110 relative to the fastening body 120 in a direction D4 towards the rear wall 106 and parallel to the bottom surface 102, and the second combining members 320 move towards the fastening body 120 through the insert opening 114. When the second combining members 320 are sleeved and hooked to the second restricting surfaces 124, the fins 322 are correspondingly hooked to the second restricting surfaces 124. Therefore, the second combining members 320 are merely restricted by the fastening body 120. At this time, the housing 310 is located in the receiving area 112a, and the second combining members 320 are located in the clipping area 112b. Therefore, the computer peripheral device 1 may prevent the second object 3 from moving in a direction D5 away from and perpendicular to the bottom surface 102.

In addition, the bottom surface 102 of the computer peripheral device 1 has a stopper 102a corresponding to the receiving area 112a, the housing 310 of the second object 3 has a fastening slot 312 on one side of the fins 322, and the stopper 102a is corresponding to the position of the fastening slot 312. Therefore, when the second object 3 is received in the computer peripheral device 1, the fastening slot 312 enters the stopper 102a, which thus restricts the movement of the second object 3 in a direction D1 away from the rear wall 106 and parallel to the bottom surface 102, and meanwhile restricts the movement of the second object 3 in a direction D2 towards the side walls 104 and parallel to the bottom surface 102. At this time, the second object 3 may be stably hooked to the computer peripheral device 1. Therefore, the user may move while carrying along the computer peripheral device 1, without worrying about the second object 3 falling off or being lost.

Based on the above, since the first combining members 220 are clamped between the fastening body 120 and the side walls 104, and the second combining members 320 are merely hooked to the fastening body 120, the restriction effect on the first combining members 220 is much stronger than that on the second combining members 320, and as a result, the combination between the first object 2 and the computer peripheral device 1 is much stronger than that between the second object 3 and the computer peripheral device 1. In detail, the first object 2 such as a buckle piece may be stably combined with the computer peripheral device 1 by the slanting surfaces, so as to prevent the computer peripheral device 1 clamped to the buckle piece from falling off during movement; and the second object 3 such as a wireless transceiver may be easily hooked to and detached from the computer peripheral device 1 by the fins 322, thereby receiving the wireless transceiver in the computer peripheral device 1.

Figure 9:
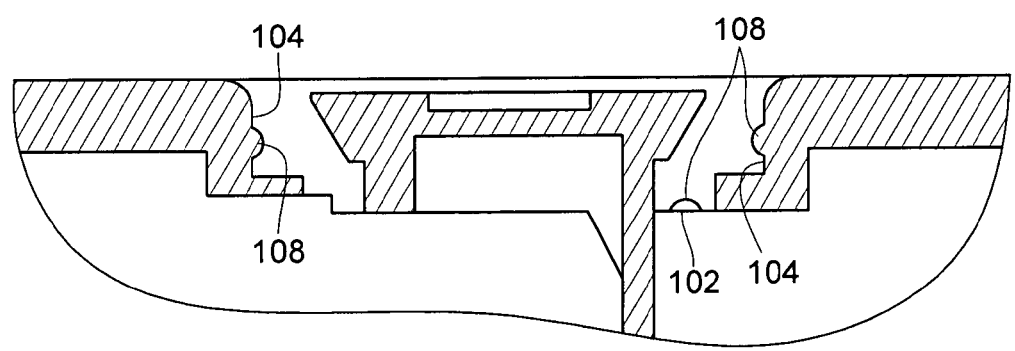
FIG. 9 is a schematic cross-sectional view of a fastening structure having a bump according to the present invention.

FIG. 9 is a schematic cross-sectional view of a fastening structure having a bump according to the present invention. Referring to FIG. 9, a bump 108 having an arc-shaped convex may be further formed on a bottom surface 102 or side walls 104 of a fastening structure of the present invention, so as to press against the first combining members or the second combining members (the first combining members 220 or the second combining members 320 as shown in FIG. 3 or 6). Moreover, the first object 2 and the second object 3 may also be bonded to the computer peripheral device 1 in a stable and easily detached manner by other means such as hooking, clamping, and magnetic attraction.

The fastening structure of the computer peripheral device of the present invention and implementation thereof may also be described as follows without departing from the spirit of the present invention. The fastening structure comprises a body. The body is similar to the housing member described in the above embodiment. The body has a combining slot recessed in one side thereof, and a fastening body extends outwards from the combining slot. In other words, the fastening body may be considered as being disposed in the combining slot. Moreover, the fastening body has at least one restricting surface on an outer side thereof, and a clipping area is respectively formed between two sides of the fastening body and the combining slot. In addition, an object has a pair of combining members, and the pair of combining members forms a combining space. Therefore, after the object enters the combining slot, the combining space accommodates the fastening body, and the combining members are fitted to the restricting surface of the fastening body, thereby fastening the fastening structure of the present invention to the object. In addition, the combining space is also just capable of accommodating the fastening body. Furthermore, the combining members are also just capable of being sleeved and hooked to the restricting surface of the fastening body.

In the fastening structure of the computer peripheral device of the present invention, the fastening body may have restricting surfaces at one angle or at different angles, and may be independently or respectively combined with the buckle piece or the wireless transceiver depending upon the requirements of the manufacturer. Therefore, by combining the fastening body of the fastening structure with different restricting surfaces, the buckle piece or the wireless transceiver may be fixed to the computer peripheral device in an appropriate combining mode, thereby effectively solving the problem that the computer peripheral device has a complex structure due to being designed with two different combining structures.

What is claimed is:

1. A fastening structure of a computer peripheral device, applicable to attach the computer peripheral device to a first object or receive a second object in the computer peripheral device, wherein the first object and the second object respectively have a first combining member and a second combining member, the fastening structure comprising:
   a combining slot; and
   a fastening body, disposed in the combining slot, and having a first restricting surface and a second restricting surface;
   wherein the first restricting surface matches the first combining member, and the second restricting surface matches the second combining member, such that the first restricting surface of the fastening body and the combining slot are clamped to the first combining member of the first object, or the second combining member of the second object is hooked to the second restricting surface of the fastening body.

2. The fastening structure of the computer peripheral device according to claim 1, wherein the combining slot is disposed on a housing member for forming the computer peripheral device, the combining slot is formed by a bottom surface, two side walls, and a rear wall and located at an end edge of the housing member, and an accommodation space and an insert opening parallel to the bottom surface are formed in the combining slot.

3. The fastening structure of the computer peripheral device according to claim 2, wherein the fastening body is disposed in the combining slot and divides the accommodation space into a receiving area and a clipping area, and the fastening body is located in the clipping area.

4. The fastening structure of the computer peripheral device according to claim 3, wherein the bottom surface has a stopper corresponding to the receiving area.

5. The fastening structure of the computer peripheral device according to claim 2, wherein an inclined angle is formed between the first restricting surface of the fastening body and the bottom surface, the first combining member has a slanting surface matching the inclined angle, and the first combining member is pressed against between the first restricting surface and the two side walls.

6. The fastening structure of the computer peripheral device according to claim 2, wherein the second restricting surface of the fastening body is parallel to the bottom surface and spaced apart from the bottom surface by a height, and the second combining member has a pair of fins matching the second restricting surface.

7. The fastening structure of the computer peripheral device according to claim wherein the fastening body has a top surface parallel to the bottom surface.

8. The fastening structure of the computer peripheral device according to claim 7, wherein the top surface has a clip slot.

9. The fastening structure of the computer peripheral device according to claim 2, wherein the bottom surface forms an arc-shaped convex.

10. A fastening structure of a computer peripheral device, applicable to be fastened to an object, the fastening structure comprising:
- a body, having a combining slot recessed in one side thereof, wherein the combining slot has a fastening body extending therein;
- the fastening body has at least one restricting surface on an outer side thereof, and a clipping area is respectively formed between two sides of the fastening body and the combining slot;
- the object has a pair of combining members, and the pair of combining members forms a combining space;
- whereby the combining space accommodates the fastening body therein, and the combining members are fitted to the restricting surface of the fastening body.

* * * * *